Feb. 28, 1939. T. N. CRAWFORD 2,148,439
CULINARY DEVICE AND SHIPPING PACKAGE
Filed Dec. 22, 1934 3 Sheets-Sheet 1

INVENTOR
Thomas N. Crawford
BY
ATTORNEYS

Feb. 28, 1939. T. N. CRAWFORD 2,148,439
CULINARY DEVICE AND SHIPPING PACKAGE
Filed Dec. 22, 1934 3 Sheets-Sheet 2
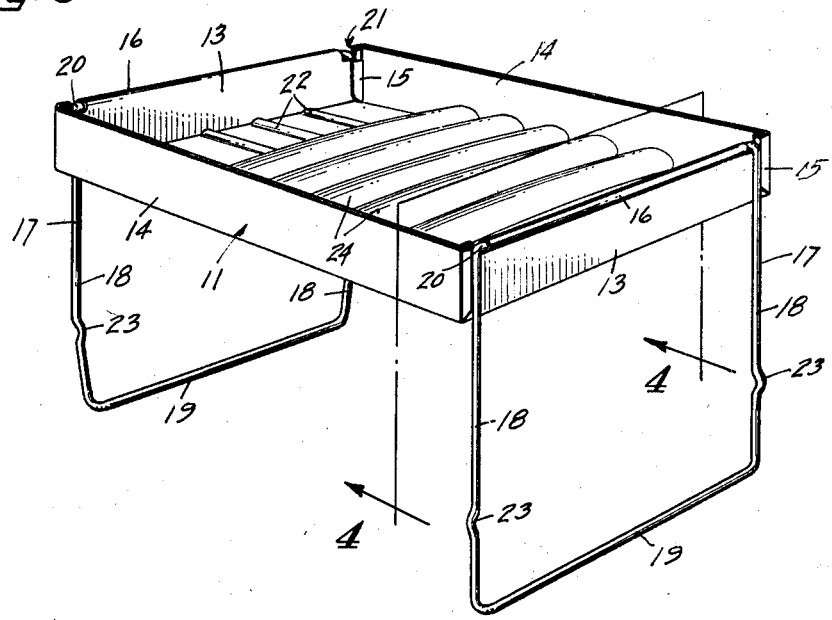
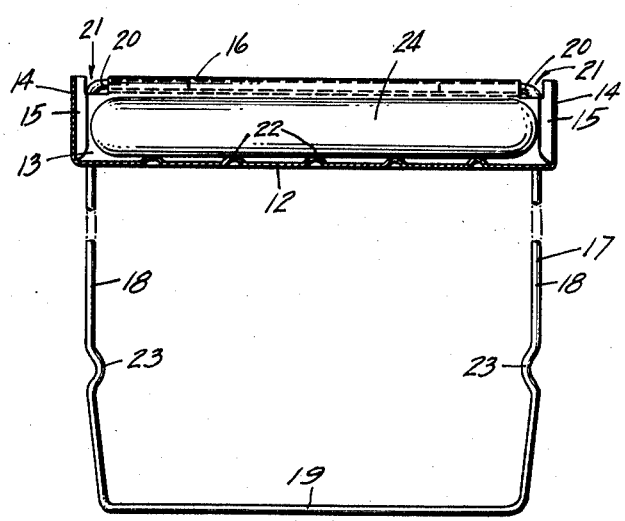

Feb. 28, 1939.     T. N. CRAWFORD     2,148,439
CULINARY DEVICE AND SHIPPING PACKAGE
Filed Dec. 22, 1934     3 Sheets-Sheet 3

INVENTOR
Thomas N. Crawford
BY
ATTORNEYS

Patented Feb. 28, 1939

2,148,439

UNITED STATES PATENT OFFICE 2,148,439

CULINARY DEVICE AND SHIPPING PACKAGE

Thomas N. Crawford, New York, N. Y.

Application December 22, 1934, Serial No. 758,814

8 Claims. (Cl. 206—46)

The present invention relates to culinary devices or utensils and has particular reference to broilers, griddles or gridirons for cooking, broiling or baking prepared meats such as frankfurters, commonly known as "hot dogs", sausages, Hamburg steaks, or other foodstuffs.

An object of the invention is the provision of a culinary utensil wherein simplicity and novelty of construction and operation, economy of manufacture, and compactness and ready mobility are the essential and outstanding features.

Another object is the provision of a device of the character described which is equally well adapted for indoor use over a cooking stove as for outdoor use over an open fire and which has simple and foldable parts which function as a handle when the device is used indoors and as legs or supports when used outdoors.

Another object is the provision of such a device which may be compactly folded and enclosed in a wrapper and utilized as a sealed container for holding a quantity of prepared meat or other food during storage and shipment and which may later be utilized as a broiler or cooker of said meat or other food.

Numerous other objects and advantages of the invention will be apparent as it is better understood from the following description, which, taken in connection with the accompanying drawings, discloses a preferred embodiment thereof.

Referring to the drawings:

Fig. 3 is a perspective view showing the utensil parts in a position for outdoor use;

Fig. 4 is a sectional view taken substantially along the plane indicated by the lines 4—4 in Fig. 3;

Figure 1:
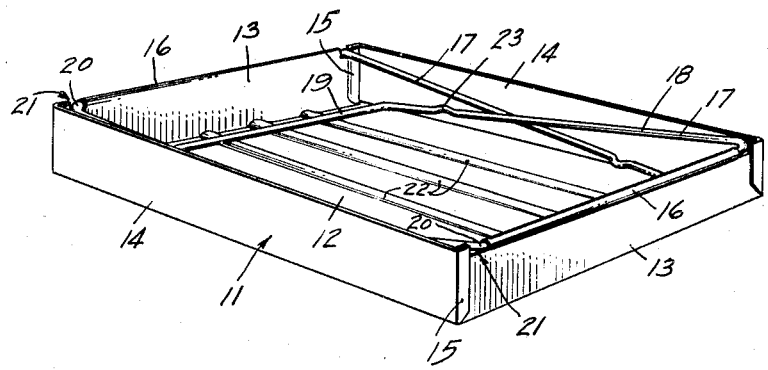
Figure 1 is a perspective view of a culinary device embodying the instant invention.

As a preferred embodiment of the invention the drawings illustrate a utensil comprising a shallow, rectangular, open top vessel, pan or griddle 11 (Fig. 1) having a substantially flat bottom 12 and enclosing end walls 13 and side walls 14 preferably formed from a single blank of sheet material. The end and side walls are joined together at the corners by interfolding their edges into lock seams 15, thus providing tight corner joints.

The upper edge of each end wall 13 is rolled outwardly in a hollow hinge curl or bead 16. Each of these curls hingedly carries a U-shaped wire or support member 17. Each support member 17 comprises a pair of straight leg sections 18 (Figs. 1 and 2) joined transversely at one end by a straight section 19, the opposite end being open. The free ends of the leg sections are bent facing each other and forming opposed pintles 20 bearing within the ends of the curls 16. The end walls 13 are cut away at 21 adjacent the lock corners to provide clearance for the members 17, when the latter are folded as shown in Fig. 1.

The length of each member 17 is slightly less than the length of the vessel 11 and similarly, its width is slightly less than the width of the vessel, so that the members may be swung on their hinge connections and disposed fully within the vessel. When the members 17 are in the folded position shown in Fig. 1 a compact package is effected, being no thicker than the height of the walls 13 and 14, which lends itself for ready packing and shipment with or without the food contents.

The device is adapted to be utilized as a broiler or griddle for prepared meats such as frankfurters, sausages, Hamburg steaks or other foods which are placed upon the bottom of the vessel 11, and the latter placed over a source of heat. For the purpose of supporting the meat above the flat portion of the vessel bottom to prevent burning or sticking of the meat to the bottom, the bottom 12 of the vessel is formed with a plurality of raised portions or ridges 22 (Figs. 1 and 4) extending the full length of the vessel. When frankfurters 24 are to be broiled in the device the frankfurters are placed crosswise over the raised portions 22 of the vessel as clearly shown in Figs. 3 and 4, the device being so dimensioned as to accommodate prepared foods of standard size.

Figure 2:
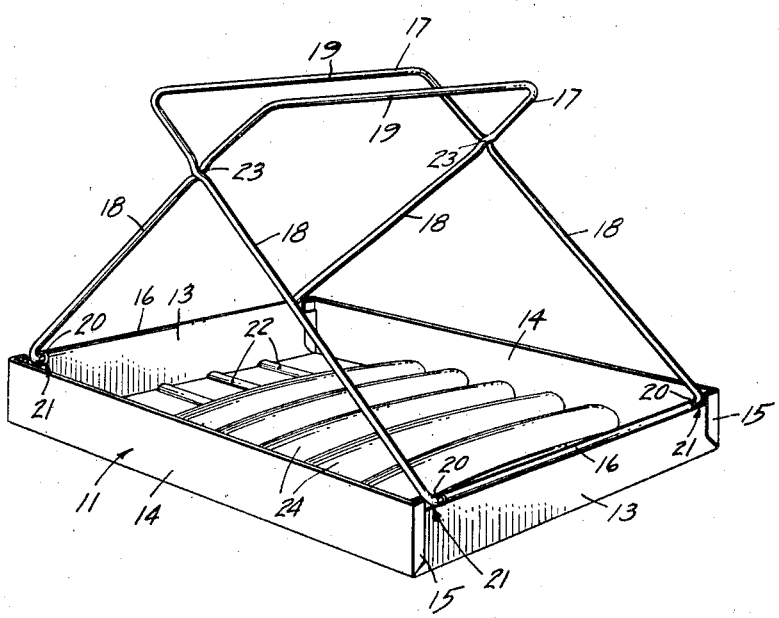
Fig. 2 is a similar view showing parts of the utensil in position for indoor use.

The device is equally adaptable to indoor broiling over a stove, where it is used like a frying pan, or to outdoor broiling over an open fire where it is used like a gridiron. For indoor broiling the wire members 17 may be telescoped one within the other in tent fashion or triangular formation, as illustrated in Fig. 2, and interlocked in such position to provide a handle for carrying the hot vessel about. This interlocking is effected by complementary locking notches or bends 23 which are formed in the leg sections 18, near the tie section 19, the notches on one member 17 being bent outwardly while on the other member they are bent inwardly, so that when they meet each other the telescoped members 17 are tightly locked together with a spring engagement.

When used outdoors over an open fire, such as a wood camp fire, the wire members 17 are swung down engaging against the end walls 13 and depending from the curls 16 at right angles to the vessel bottom 12. In this position the members 17 function as supporting legs, which may be imbedded in the fire embers for holding the vessel above the fire in broiling position, as illustrated in Figs. 3 and 4.

Figure 5:
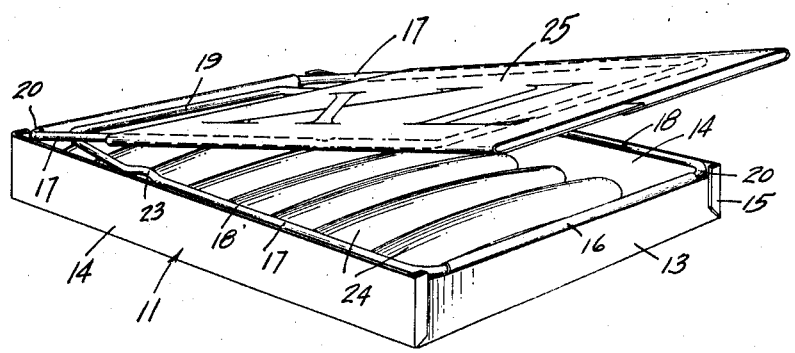
Fig. 5 is a perspective view showing the device partially assembled as a shipping package.
Figure 6:
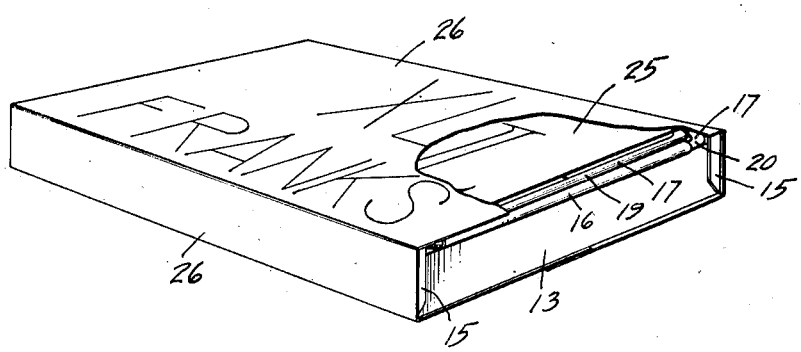
Fig. 6 is a similar view with parts broken away showing the device fully wrapped for shipment.

The invention also contemplates the utilization of the vessel 11 as a container or shipping and advertising package in which food of the character described may be packed and shipped and advertised for future use and commercially marketed as a convenient compact package for home use or picnic purposes or the like. If used as a shipping package the members 17 (Fig. 5) are hinged over on top of the contents, for example frankfurters 24, which may have individual or collective wrappers of suitable material such as wax paper. When thus used as a food or shipping package it may be desirable to place an instruction or advertising sheet or card within the package. Reference numeral 25 (Fig. 5) denotes such an advertising sheet in the form of a sleeve or folded panel member which may be slid over the upper wire member 17, thus also forming with the member 17 a flat inner hinge cover. These assembled parts may then be further enclosed or protected in an outer wrapper which may be a sliding cover 26 having the general shape of the vessel 11 and adapted to telescope thereover and enclose the same on all sides except its two end walls. The outer wrapper or cover may be suitably decorated and imprinted to indicate the origin, quantity or quality of the contents, as may be preferred.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A culinary device and package, comprising, in combination, a vessel adapted to hold food to be shipped and to be cooked therein, means hingedly connected with said vessel at opposite ends thereof to support said vessel over a source of heat and to also serve as a handle for said vessel, one of said means having a removable panel member adapted to serve with said means as a hinge cover for said vessel.

2. In a combined culinary device and shipping package, the combination of a vessel for holding food during storage and shipment thereof and adapted to be utilized as a utensil for cooking the food therein, a pair of U-shaped supporting members secured to the opposite ends of said vessel, the free ends of each U-shaped supporting member being hingedly mounted in said vessel, said supporting members being movable on their hinge mountings towards one another and relative to said vessel to nest within the latter, and a sliding cover member having telescoping engagement with said vessel to seal the latter and said supporting members when the latter are folded within the vessel to provide a compact package for storage and shipment.

3. In a combined culinary device and shipping package the combination of a vessel for holding food during storage and shipment thereof and adapted to be utilized as a utensil for cooking the food therein, a pair of U-shaped supporting members secured to the opposite ends of said vessel, the free ends of each U-shaped supporting member being hingedly mounted in said vessel, said supporting members being movable on their hinge mounting towards one another to nest within the vessel, and a sliding open-ended tubular cover member having telescoping engagement with said vessel to seal the latter and said supporting members when the latter are folded within the vessel to provide a compact package for storage and shipment.

4. A culinary device, comprising, a vessel for holding food to be cooked, and complementary elongated support members pivotally mounted on said vessel at opposite ends thereof and movable relative thereto towards one another into partially telescoped position to serve as a handle for said vessel when said support members project upwardly therefrom, said members being further movable in the opposite direction to depend downwardly below the bottom of the vessel to serve as a support therefor, said members having means thereon to removably interlock the same together when in said partially telescoped position to serve as a handle for said vessel.

5. A culinary device, comprising a vessel for holding food to be cooked, means in said vessel for supporting said food above the bottom of the vessel and out of complete engagement therewith, and complementary elongated support members pivotally mounted at opposite ends of said vessel and movable relative thereto towards one another into partially telescoped position to serve as a handle for said vessel when said support members project upwardly therefrom, said members being further movable on their pivotal mounting in the opposite direction to depend downwardly below the bottom surface of the vessel to serve as a support therefor, said members having means thereon to removably interlock the same together when in said partially telescoped position to serve as a handle for said vessel.

6. A cooking utensil for broiling frankfurters and the like, comprising a vessel for holding said frankfurters, and complementary elongated support members hingedly secured to said vessel at opposite ends thereof, each of said support members being pivotally movable into position projecting above the top of the vessel and having deformed portions to interlock said members together in telescoped position when so moved to serve as a handle when the vessel is placed on a stove, said hingedly mounted support members being further movable on their hinged mounting in the opposite direction to a position substantially perpendicular to and extending below the bottom of said vessel, whereby the latter may be disposed over an open fire with said support members serving as supporting legs for spacing said vessel above the fire.

7. In a culinary device the combination of a food holding vessel having upstanding walls, each of two opposed walls having a curled portion at its upper edge, complementary elongated U-shaped supporting members pivotally secured to the opposite ends of said vessel, the free ends of each U-shaped supporting member being hingedly mounted in the curled portion of a said opposed wall member, whereby said supporting members may be swung towards one another to project above the vessel in partially telescoped position to collectively provide an upwardly projecting handle for said vessel, said supporting members being further movable on their hinge supports in the opposite direction to depend downwardly from and below the bottom surface of the vessel to provide means for elevating and spacing the vessel above a supporting surface.

8. In a culinary device the combination of a food holding vessel having upstanding walls, each of two opposed walls having a curled portion at its upper edge, complementary elongated U-shaped supporting members secured to the opposite ends of said vessel, the free ends of a each U-shaped supporting member being hingedly mounted in the curled portion of a said opposed wall member, whereby said supporting members may be swung upwardly and towards one another to project above the vessel in partially telescoped position to collectively provide an upwardly projecting handle for said vessel, said supporting members being further movable on their hinge mountings in the opposite direction away from one another to depend downwardly from and below the bottom surface of the vessel to provide means for elevating and spacing the vessel above a supporting surface, and means on said supporting members to removably lock the same together when the supporting members are projecting towards one another above the vessel to serve as a handle for the latter.

THOMAS N. CRAWFORD.